US008033780B2

(12) United States Patent
Watters

(10) Patent No.: US 8,033,780 B2
(45) Date of Patent: Oct. 11, 2011

(54) APPARATUS FOR INVERTING HEAVY LOADS AND METHOD OF USING SAME

(76) Inventor: Keith E. Watters, Greenwich, NY (US)

(*) Notice: Subject to any disclaimer, the term of this patent is extended or adjusted under 35 U.S.C. 154(b) by 338 days.

(21) Appl. No.: 12/271,391

(22) Filed: Nov. 14, 2008

(65) Prior Publication Data
US 2009/0123263 A1 May 14, 2009

Related U.S. Application Data

(60) Provisional application No. 60/987,773, filed on Nov. 14, 2007.

(51) Int. Cl.
B22C 11/00 (2006.01)
B66C 1/10 (2006.01)
(52) U.S. Cl. ................................ 414/779; 414/767
(58) Field of Classification Search .............. 269/55, 269/57, 82, 905; 414/758, 764–767, 771, 414/773, 778–779, 782; 83/35–36
See application file for complete search history.

(56) References Cited

U.S. PATENT DOCUMENTS

| 952,789 | A | * | 3/1910 | Dimon | 414/766 |
| 1,486,609 | A | * | 3/1924 | Schwab | 414/758 |
| 1,623,958 | A | | 4/1927 | Bauer | |
| 1,660,016 | A | * | 2/1928 | Schlothan | 254/3 C |
| 1,956,120 | A | | 4/1934 | Cowl | |
| 3,356,230 | A | * | 12/1967 | Anderson | 414/779 |
| 3,913,471 | A | * | 10/1975 | Vyhnalek | 99/452 |
| 4,127,199 | A | * | 11/1978 | Clethero | 414/12 |
| 4,436,078 | A | | 3/1984 | Bourke | |
| 4,822,967 | A | * | 4/1989 | Kumagami et al. | 219/752 |
| 5,605,141 | A | * | 2/1997 | Bilotta | 125/16.02 |
| 5,888,043 | A | | 3/1999 | Jatcko | |
| 2007/0137534 | A1 | | 6/2007 | Dhanoa et al. | |

* cited by examiner

Primary Examiner — Gregory Adams
(74) Attorney, Agent, or Firm — Schmeiser, Olsen & Watts, LLP

(57) ABSTRACT

An apparatus is provided for inverting heavy objects, the apparatus including: a retaining assembly, including two opposing retaining members each having rotational pins extending from the ends thereof, the rotational pins all reside together in a cross plane extending parallel with a longitudinal axis of the retaining assembly, and the retaining members are spaced apart a consistent distance, a base member, including two open double bearing components positioned at opposite ends of the base member, each open double bearing component including two side-by-side troughs, and a securing member, operable to lock the retaining assembly into a secure position with respect to the base member.

12 Claims, 15 Drawing Sheets

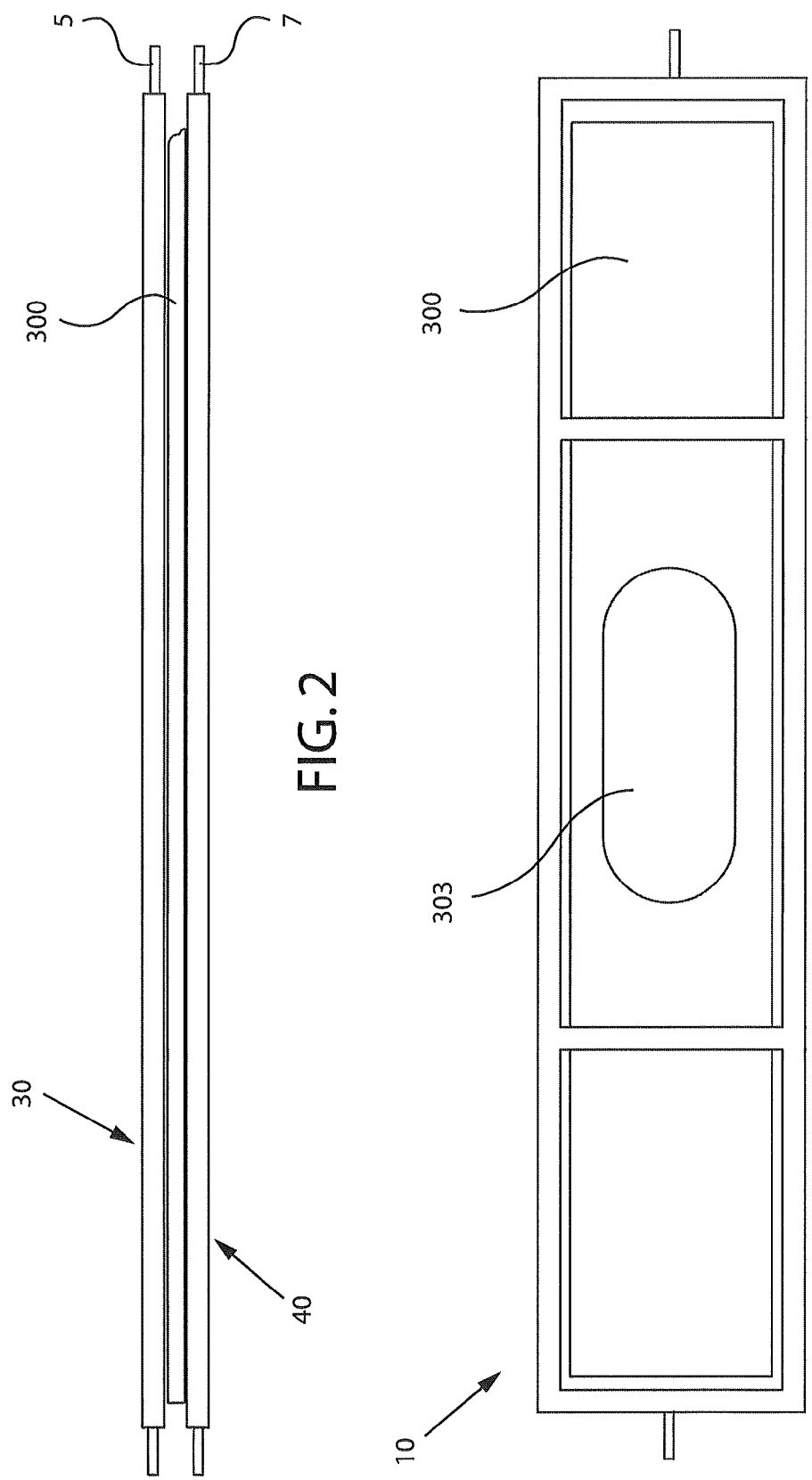

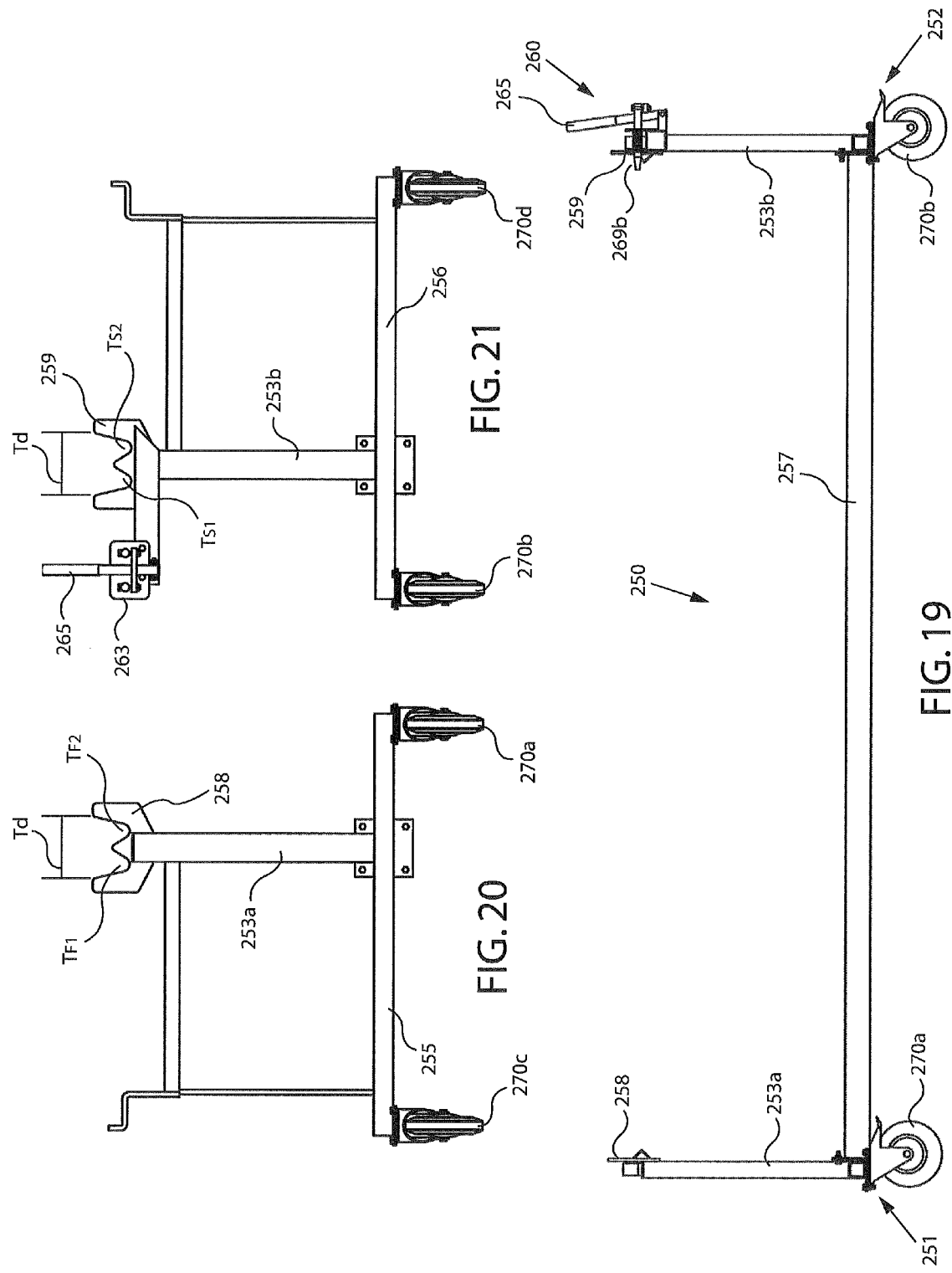

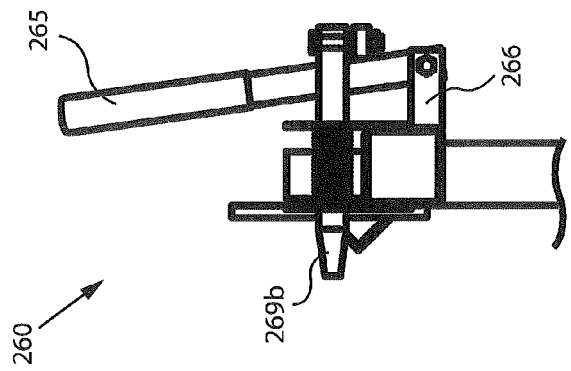
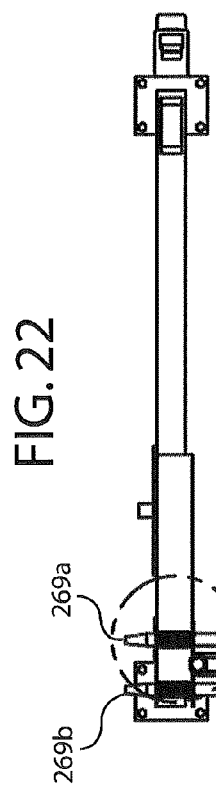
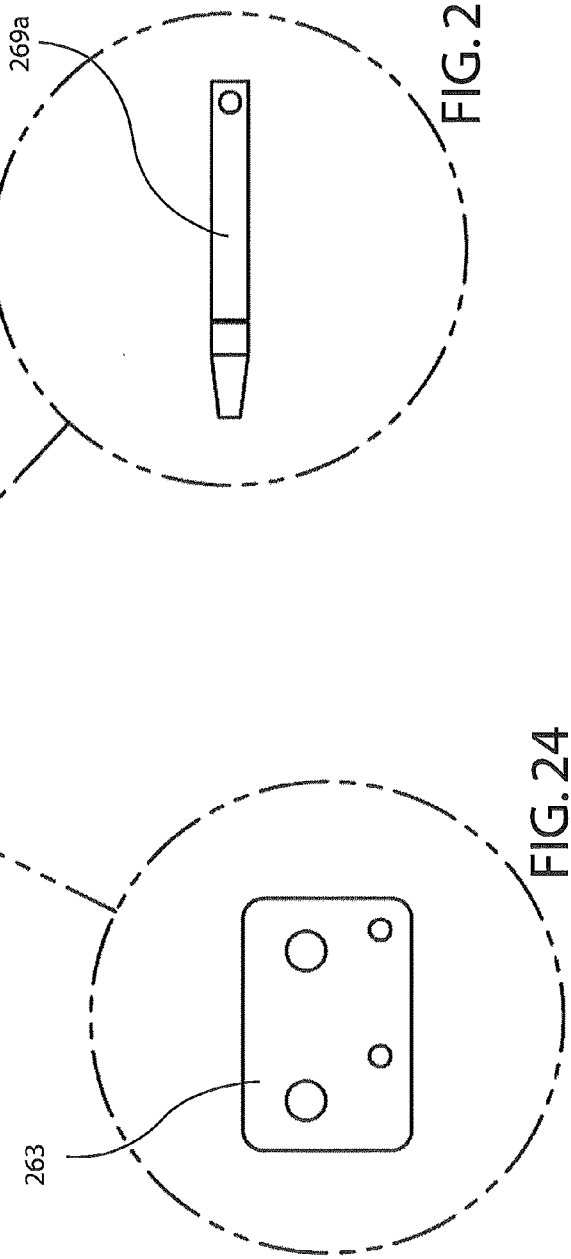

APPARATUS FOR INVERTING HEAVY LOADS AND METHOD OF USING SAME

CROSS REFERENCE TO RELATED APPLICATION

This application hereby claims the benefit of U.S. Provisional Application No. 60/987,773 filed Nov. 14, 2007, the contents of which are hereby incorporated herein by reference in their entirety.

FIELD OF THE INVENTION

The present invention relates generally to a turning apparatus for inverting heavy objects and method of using the same. More specifically, the present invention relates to an apparatus and method for inverting heavy planar object about a longitudinal axis over 360°, such as turning over a granite countertop to expose a bottom surface.

BACKGROUND OF THE INVENTION

Inversion of heavy objects may be needed to enable workers or craftsmen convenient access to each working surface of the object. Often the weight or size of the object itself may create a potential for the object to, fracture, crack, snap, or otherwise become damage when it is moved. For example, when manufacturing granite countertops, it is often desirable or necessary to work on both the top and bottom surfaces of the counter top. Moreover, the design of the countertop may be such that significant holes or grooves may be cut into the granite (such as a hole cut out for a sink, or a groove cut out for acceptance of metal support structures). When the weighty counter top is inverted, the counter top may break due to the force of its own weight during the inversion process. In addition, the weight of the counter top may make it difficult or substantially impossible for only one or a few workers to invert the counter top. Therefore there is a need for supporting devices of heavy objects that provide access to upper and lower surfaces.

SUMMARY OF THE INVENTION

The present invention provides an apparatus and method for inverting heavy objects that offers improved reliability.

One aspect of the present invention provides an apparatus for inverting a heavy object, comprising: a clamping assembly having first and second opposing planar surfaces of the heavy object sandwiched between planar surfaces of first and second opposing clamps, wherein first rotation pins extend from each end of the first opposing clamp and second rotation pins extend from each end of the second opposing clamp of the clamping assembly in the same plane along a longitudinal axis of the clamping assembly; and a first and second open hinge, each first and second open hinge having first and second adjacent grooves and an apex between the first and second adjacent grooves, wherein a first wall of each first and second hinge rises obliquely to the apex from the first adjacent groove and a second wall rises obliquely to the apex from the second adjacent groove, and wherein the first rotation pins straddle the apex and lies on the second oblique wall of the first and second open hinges when the second rotation pin lies in the first groove from which the first oblique wall rises of the first and second open hinges.

A second aspect of the present invention provides a method for inverting a heavy object, comprising: providing a clamping assembly having first and second opposing clamps for sandwiching opposing planar surfaces of the heavy object, wherein first rotation pins extend from the first opposing clamp and second rotation pins extend from the second opposing clamp of the clamping assembly in the same plane along a longitudinal axis of the clamping assembly; a first and second open hinge supported at each end of the clamping assembly, each first and second open hinge having first and second adjacent grooves and an apex between the first and second adjacent grooves, wherein a first wall of the hinge rises obliquely to the apex from the first adjacent groove and a second wall rises obliquely to the apex from the second adjacent groove; wherein the first rotation pins straddle the apex and lie on the second oblique wall of the first and second open hinges when the second rotation pins lie in the first groove from which the first oblique wall rises of the first and second open hinges; rotating the clamping assembly so that the first rotation pins straddles the apex and lies on the second oblique wall of the first and second open hinges when the second rotation pins lie in the first groove from which the first oblique wall rises of the first and second open hinges; and inverting the heavy object substantially 180° by rotating the clamping assembly so that the second rotation pins straddle the apex and lie on the first oblique wall of the first and second open hinges when the first rotation pins lie in the second groove from which the second oblique wall rises of the first and second open hinges.

A third aspect of the present invention provides an apparatus for inverting a heavy object, comprising: a retaining assembly, the retaining assembly including a first substantially planar retaining member and a second substantially planar retaining member, the first and second retaining members each having a first end, from which a first end rotation pin extends, and an opposing second end, from which a second end rotation pin extends, wherein the first and second retaining members are configured to be securely spaced apart so that a substantially consistent distance exists between opposing surfaces of the substantially planar retaining members, and so that the first end rotational pins of the first and second retaining members and the second end rotational pins of the first and second retaining members all reside together in a cross plane extending parallel with a longitudinal axis of the retaining assembly, a base member, the base member having a first base end and an opposing second base end, wherein each of the first and second opposing ends of the base member include an open double bearing component, each open double bearing component including two side-by-side troughs, the troughs positioned so that spacing therebetween is not wider than the substantially consistent distance existent between the spaced apart first and second retaining members and so that the total side-by-side spacing occupied by both troughs is not narrower than the substantially consistent distance existent between the spaced apart first and second retaining members, and a securing member, operable to lock the retaining assembly into a secure position with respect to the base member, wherein both the first end and the second end rotational pins of one of the retaining members reside in corresponding opposing troughs of each opposing open double bearing component of the base member.

BRIEF DESCRIPTION OF THE DRAWINGS

Some of the embodiments of this invention will be described in detail, with reference to the following figures, wherein like designations denote like members, wherein:

FIG. 2 depicts a side view of an embodiment of a clamping assembly, in accordance with embodiments of the present invention;

FIG. 3 depicts a top view of an embodiment of a clamping assembly, in accordance with embodiments of the present invention;

FIG. 19 depicts a side view of an embodiment of a base member of a heavy load inverting apparatus, in accordance with embodiments of the present invention;

FIG. 20 depicts a first end view of an embodiment of a base member of a heavy load inverting apparatus, in accordance with embodiments of the present invention;

FIG. 21 depicts a second end view of an embodiment of a base member of a heavy load inverting apparatus, in accordance with embodiments of the present invention;

FIG. 22 depicts a top view of an embodiment of a securing assembly located on a portion of an embodiment of a second end of a base member of a heavy load inverting apparatus, in accordance with embodiments of the present invention;

FIG. 23 depicts a top view of an embodiment of a securing member of an embodiment of a securing assembly of a heavy load inverting apparatus, in accordance with embodiments of the present invention;

FIG. 24 depicts a second end view of an embodiment of a guide plate of an embodiment of a securing assembly of a heavy load inverting apparatus, in accordance with embodiments of the present invention; and FIG. 25 depicts a side view of an embodiment of a securing assembly of a heavy load inverting apparatus, in accordance with embodiments of the present invention.

DETAILED DESCRIPTION OF THE INVENTION

Figure 1:
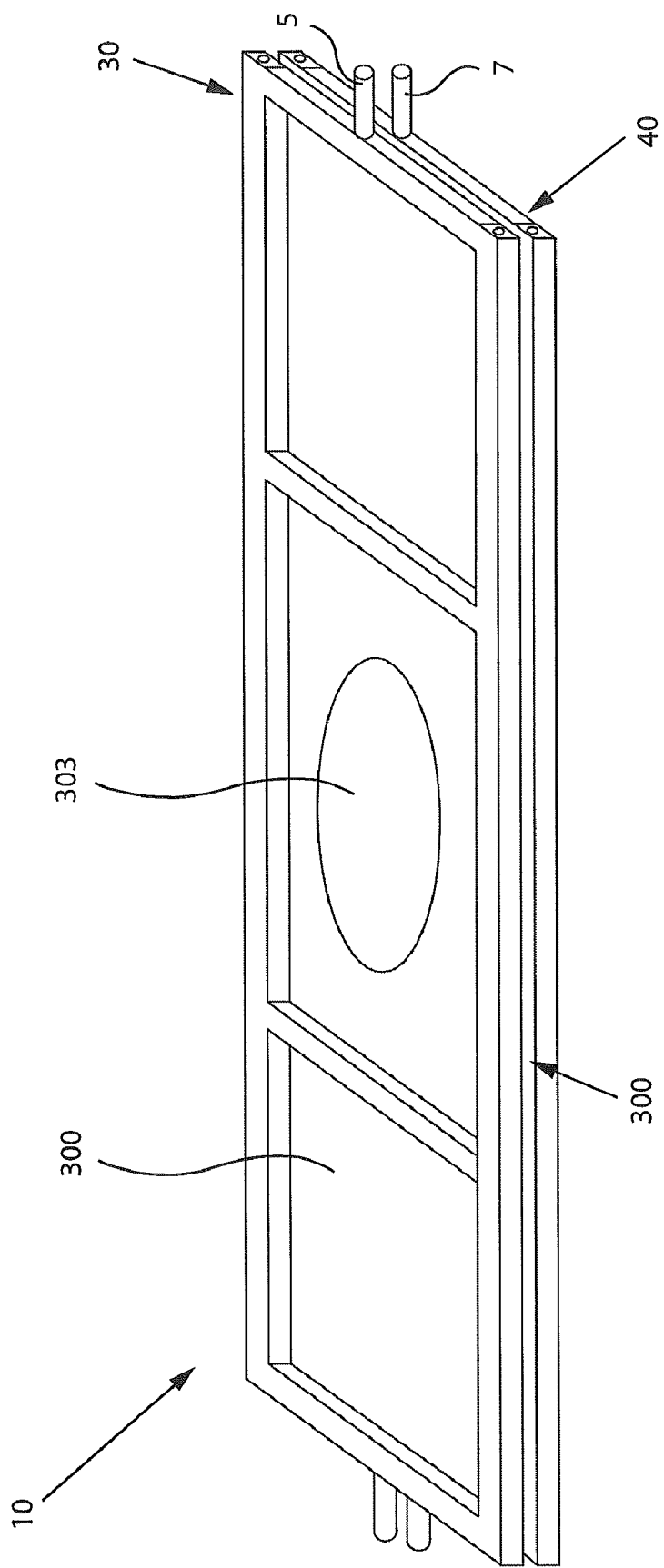
FIG. 1 depicts a front perspective elevation view of an embodiment of a clamping assembly, in accordance with embodiments of the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

FIG. 1 depicts a front elevation view of a clamping assembly 10, in accordance with embodiments of the present invention. The clamping assembly 10 comprises: a first opposing clamp, such as the top frame 30 depicted; a second opposing clamp, such as the bottom frame 40 depicted; a heavy object such as a stone wafer 300 sandwiched between the frames 30, 40; and first and second rotation pins 5, 7, wherein the first and second rotational pins 5, 7, are in the same plane extending along a longitudinal axis of the clamping assembly 10. The heavy object may have cut out portions, such as a hole 303 for a sink.

FIG. 2 depicts a side view of the clamping assembly 10, in accordance with embodiments of the present invention. FIG. 2 illustrated that first and second rotational pins 5, 7, are in the same plane extending along a longitudinal axis of the clamping assembly 10. FIG. 2 also illustrates that the heavy weight 300 may be a stone or glass or heavy panel sandwiched between the first opposing clamp and the second opposing clamp, such as the top 30 and bottom frames 40, respectively, illustrated in FIG. 2.

FIG. 3 depicts a top view of the clamping assembly 10, in accordance with embodiments of the present invention.

Figure 4:
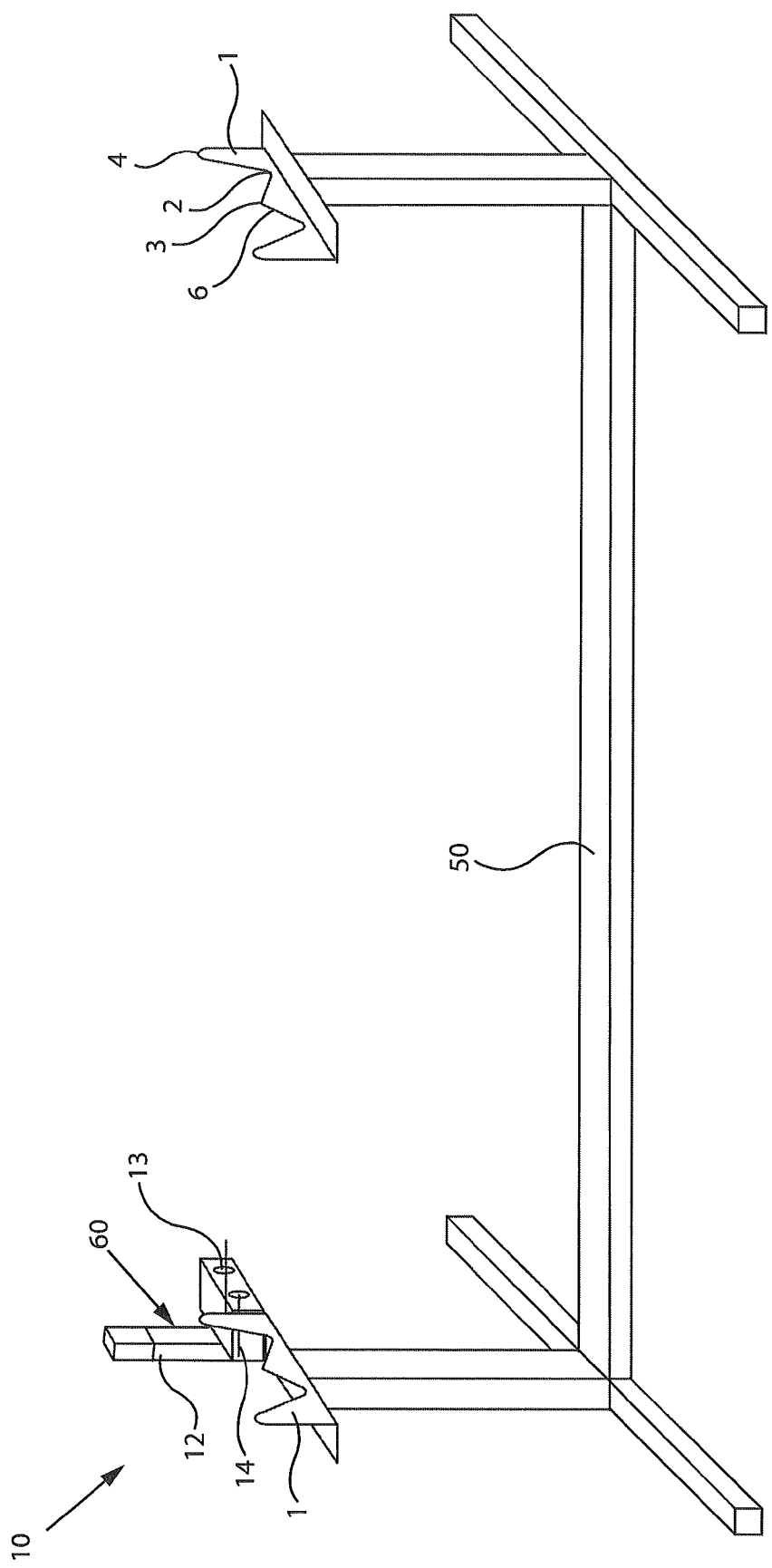
FIG. 4 depicts a perspective elevation view of an embodiment of a support for an embodiment of a clamping assembly, in accordance with embodiments of the present invention.

FIG. 4 depicts a front elevation view of the clamping assembly 10, comprising first and second open hinges 1 at each end of the support such as the table base 50 of the clamping assembly 10. Each open hinge 1 comprises: first and second adjacent grooves 2, a first oblique wall extending from first groove 2 and second oblique wall 6 extending from an adjacent second groove to form apex 3.

FIG. 4 depicts a locking mechanism 60 comprising a lever 12 operably coupled to locking pins 14 which may extend through openings 13. When locking pins 14 extend into coextensive holes in the clamping assembly 10, the assembly 10 may be locked into a planar orientation with respect to the craftsman or stoneworker.

Figure 5:
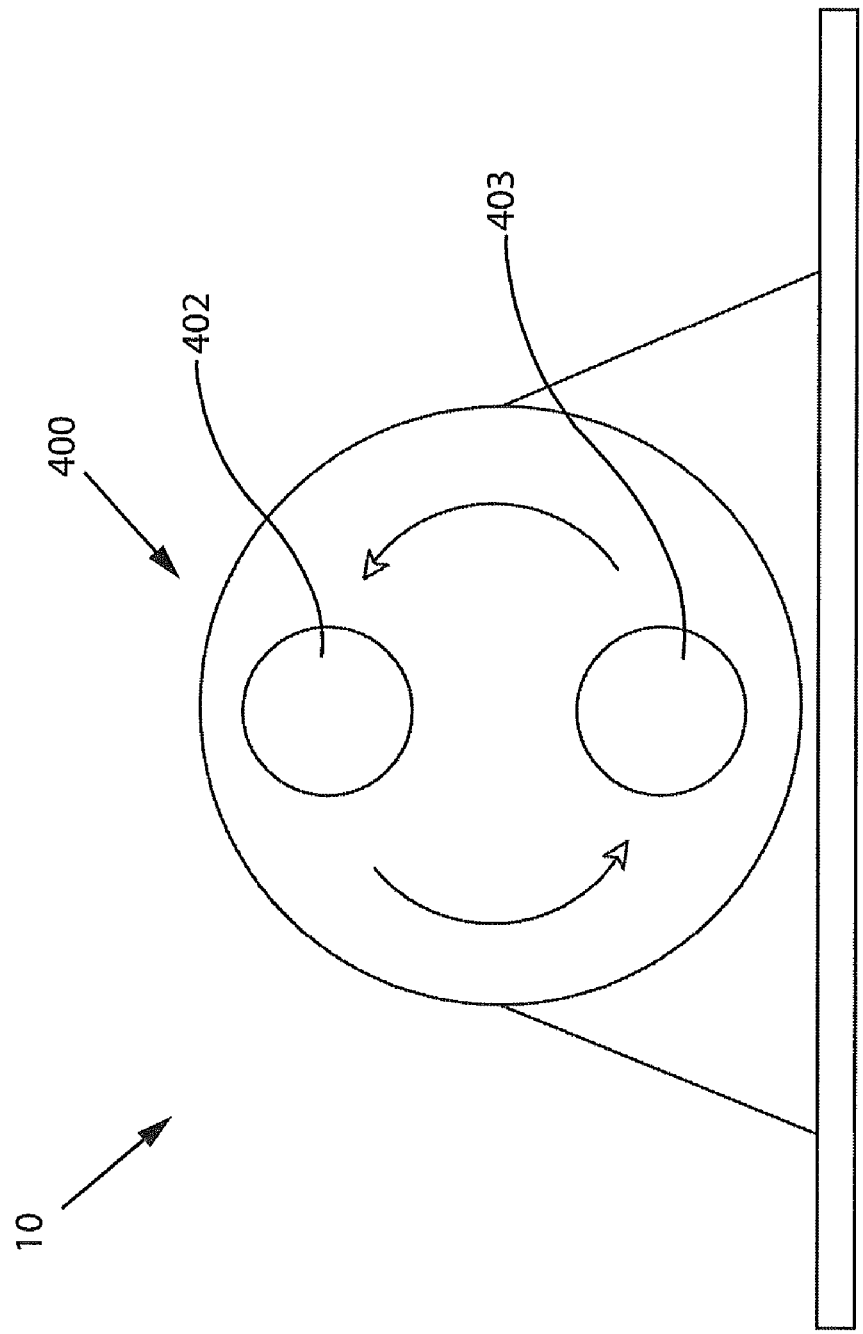
FIG. 5 depicts a cross sectional view of an embodiment of a rotary hinge, in accordance with embodiments of the present invention.

FIG. 5 depicts an embodiment of a rotary hinge substitute 400 for the open hinge of FIGS. 1-4. The rotary hinge 400 may include a top frame pin 402 and a bottom frame pin 403.

Figure 6:
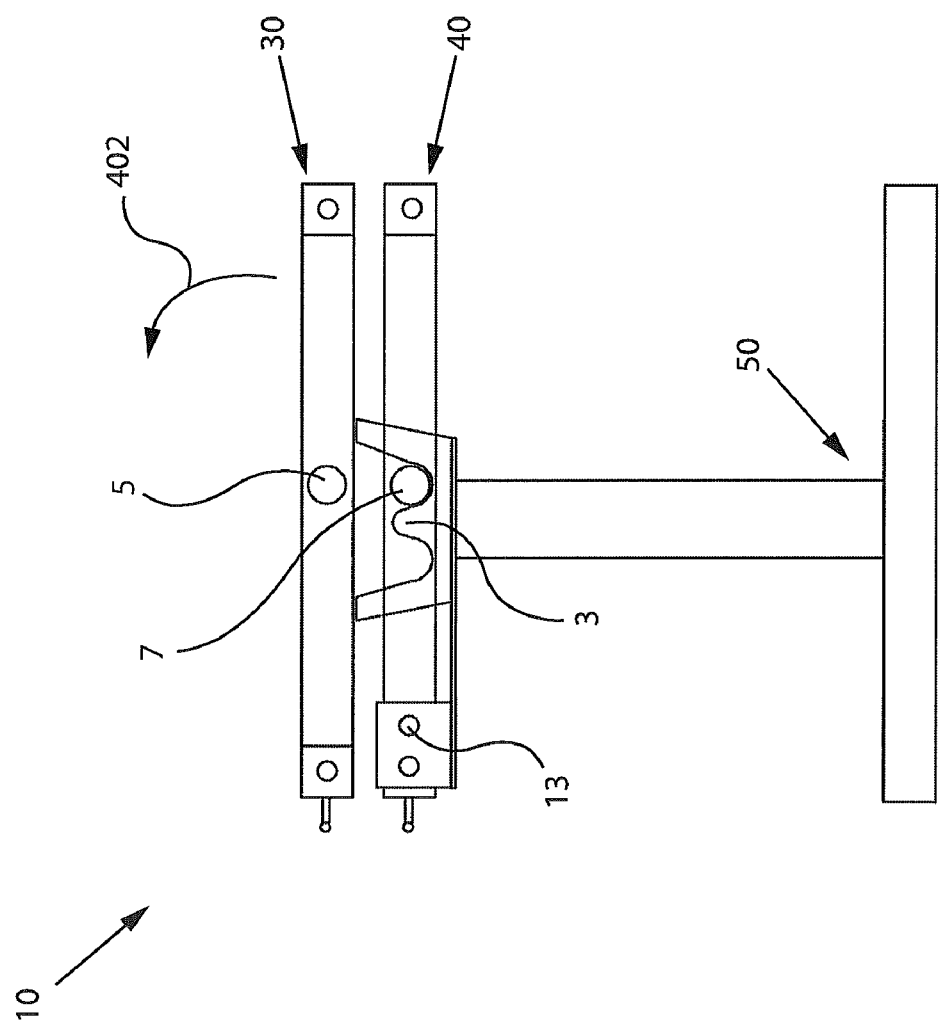
FIG. 6 depicts a side view of an embodiment of a support for an embodiment of a clamping assembly, in accordance with embodiments of the present invention.

FIG. 6 depicts a side view of the support for the clamping assembly 10, in accordance with embodiments of the present invention. In FIG. 6, the first and second rotating pins 5, 7 are depicted in the same plane along the longitudinal axis of the clamping assembly 10. In this embodiment, the locking mechanism 13 has locked the clamping assembly in a planar position relative to the clamping assembly support or table base 50 craftsman or stoneworker. In this embodiment, when the clamping mechanism is rotated in a direction of rotation shown, the first rotating pin straddles the apex 3 and comes to rest on the second oblique wall extending from the second groove adjacent to the apex 3 of the open hinge 1, as depicted in FIG. 4, and described in associated text, supra.

Figure 7:
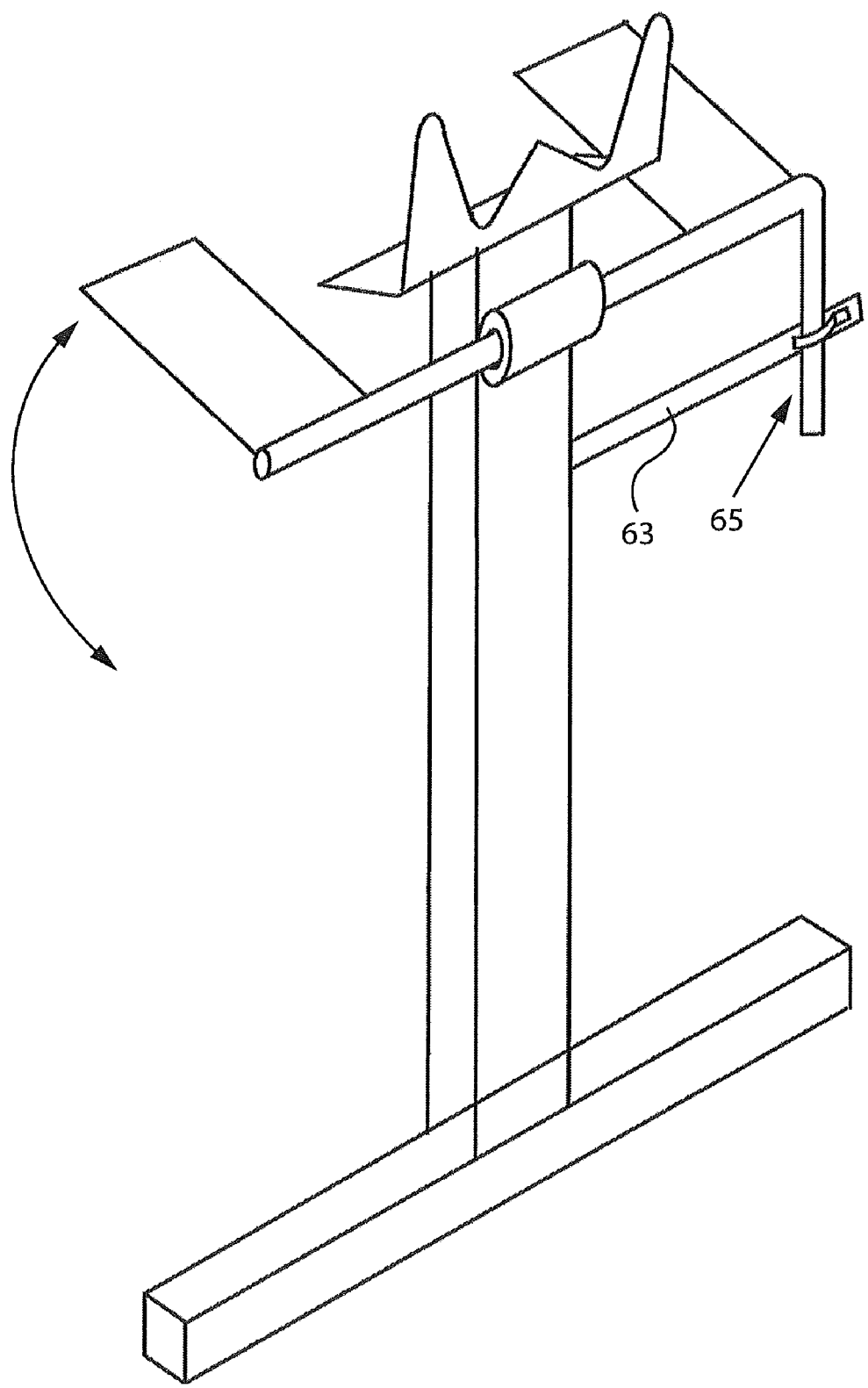
FIG. 7 depicts side perspective elevation view of an embodiment of a support for an embodiment of a clamping assembly, in accordance with embodiments of the present invention.

FIG. 7 depicts side elevation view of the support for the clamping assembly 10, in accordance with embodiments of the present invention. In this embodiment, a handle 65 operably coupled to paddles 63 may orient the paddles 63 so that they are coplanar with the clamping assembly 10, locking it into the planar position shown in FIG. 6.

Figure 8:
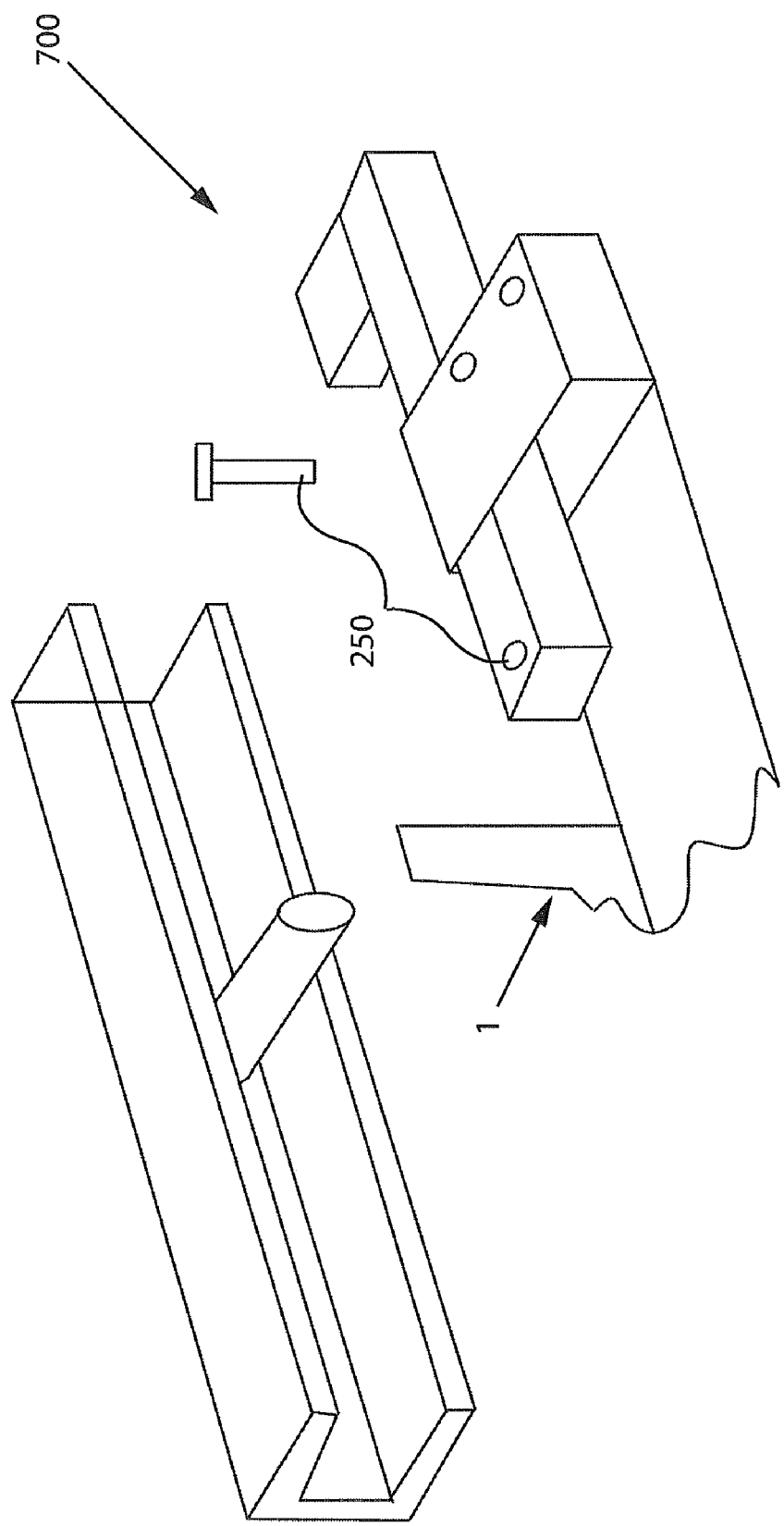
FIG. 8 depicts a side perspective elevation view of an embodiment of a support for an embodiment of a clamping assembly, in accordance with embodiments of the present invention.

FIG. 8 depicts a side elevation view of the support for the clamping assembly 10, in accordance with embodiments of the present invention. In FIG. 8, a locking means 700 may pivot at the pivot point so that the locking means 700 may engage the lock location 250 of the frame when rotational pin of a first clamp or frame may lie in first groove 2, thereby locking the first clamp or frame in a planar position relative to the craftsperson or stoneworker, as in FIG. 6.

Figure 9:
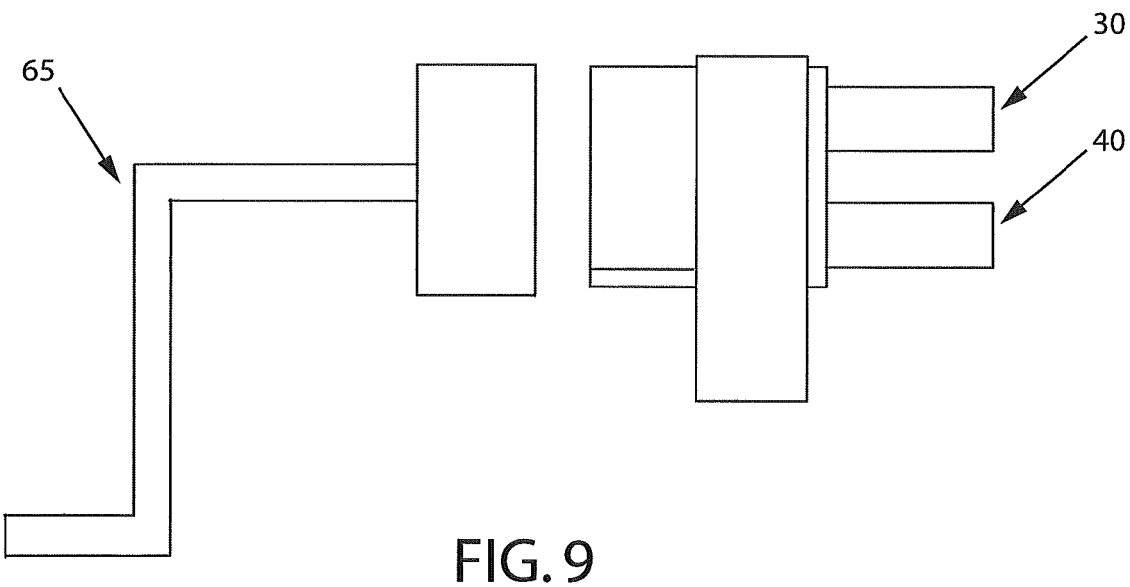
FIG. 9 depicts a side view of an embodiment of a clamping assembly, in accordance with embodiments of the present invention.
Figure 10:
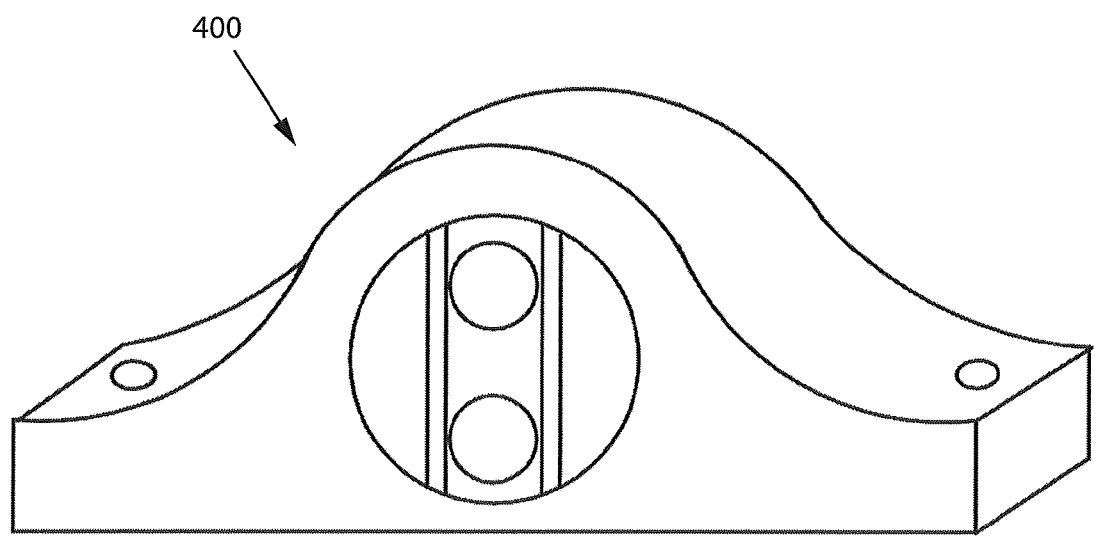
FIG. 10 depicts a front view of an embodiment of a clamping assembly, in accordance with embodiments of the present invention.

FIGS. 9 and 10 illustrate a pillow block bearing that may be used instead of the open hinge 1 during inversion of the clamping assembly through 360°. An electric motor or other appropriate device may be used to rotate the bearing and operably coupled top and bottom frames of the clamping assembly 10.

One aspect of the present invention provides an apparatus for inverting a heavy object, comprising: a clamping assembly 10 having first and second opposing planar surfaces of the heavy object sandwiched between planar surfaces of first and second opposing clamps, wherein first rotation pins extend from each end of the first opposing clamp and second rotation pins extend from each end of the second opposing clamp of the clamping assembly in the same plane along a longitudinal axis of the clamping assembly; and a first and second open hinge, each first and second open hinge having first and second adjacent grooves and an apex between the first and second adjacent grooves, wherein a first wall of each first and second hinge rises obliquely to the apex from the first adjacent groove and a second wall rises obliquely to the apex from the second adjacent groove, and wherein the first rotation pins straddle the apex and lies on the second oblique wall of the first and second open hinges when the second rotation pin lies in the first groove from which the first oblique wall rises of the first and second open hinges.

A second aspect of the present invention provides a method for inverting a heavy object, comprising: providing a clamping assembly 10 having first and second opposing clamps for sandwiching opposing planar surfaces of the heavy object, wherein first rotation pins extend from the first opposing clamp and second rotation pins extend from the second opposing clamp of the clamping assembly in the same plane along a longitudinal axis of the clamping assembly; a first and second open hinge supported at each end of the clamping assembly, each first and second open hinge having first and second adjacent grooves and an apex between the first and second adjacent grooves, wherein a first wall of the hinge rises obliquely to the apex from the first adjacent groove and a second wall rises obliquely to the apex from the second adjacent groove; wherein the first rotation pins straddle the apex and lie on the second oblique wall of the first and second open hinges when the second rotation pins lie in the first groove from which the first oblique wall rises of the first and second open hinges; rotating the clamping assembly so that the first rotation pins straddles the apex and lies on the second oblique wall of the first and second open hinges when the second rotation pins lie in the first groove from which the first oblique wall rises of the first and second open hinges; and inverting the heavy object substantially 180° by rotating the clamping assembly so that the second rotation pins straddle the apex and lie on the first oblique wall of the first and second open hinges when the first rotation pins lie in the second groove from which the second oblique wall rises of the first and second open hinges.

Figure 11:
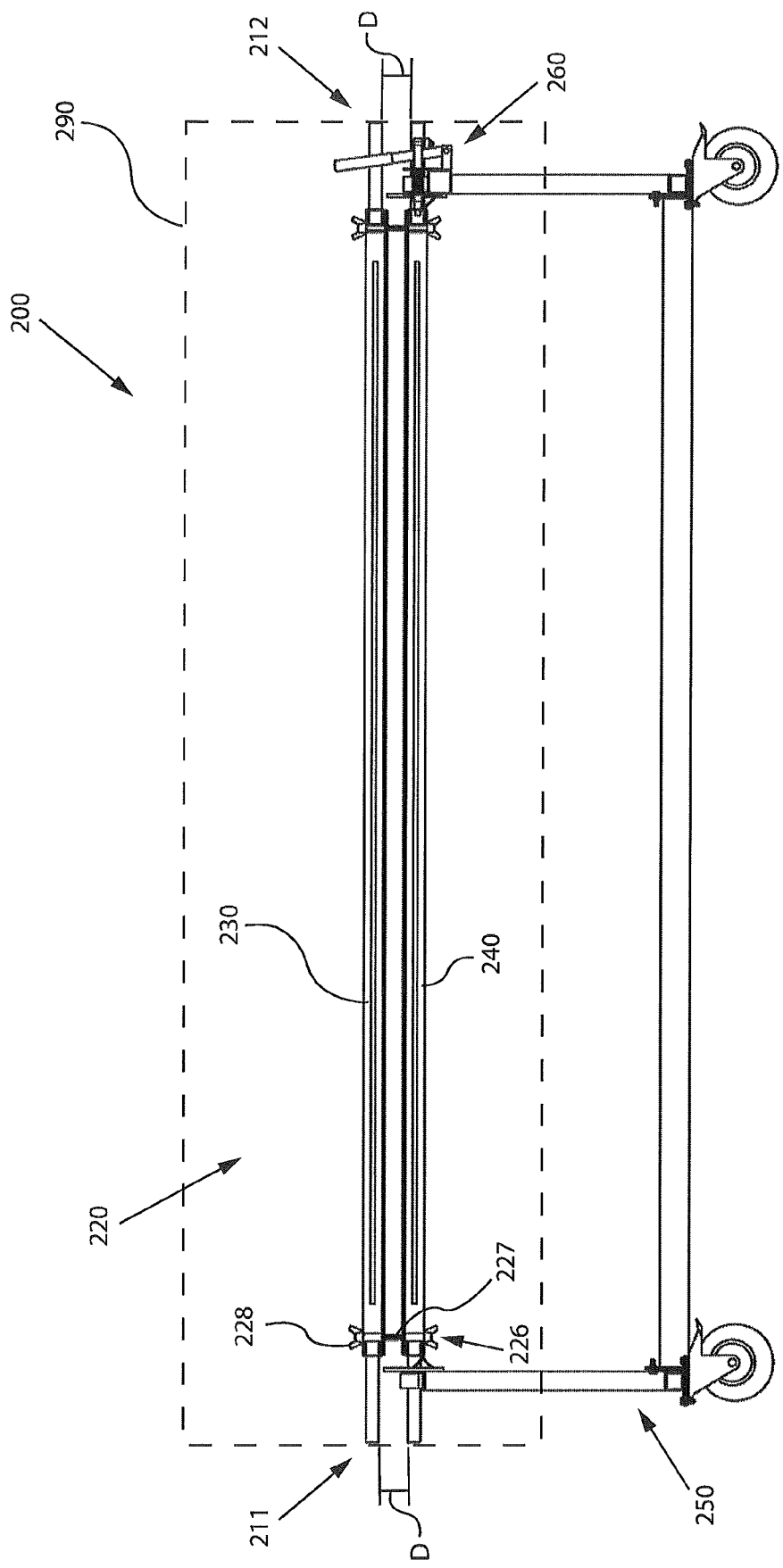
FIG. 11 depicts a side view of an embodiment of a heavy load inverting apparatus, in accordance with embodiments of the present invention.

With continued reference to the drawings, FIG. 11 depicts a side view of an embodiment of a heavy load inverting apparatus 200, in accordance with embodiments of the present invention. The heavy load inverting apparatus 200 includes a first end 211 and a second end 212. In addition, the heavy load inverting apparatus 200 includes a retaining assembly 220. The retaining assembly may include a first substantially planar retaining member 230 and a second substantially planar retaining member 240. The first and second retaining members 230, 240 may be configured to be securely spaced apart so that a substantially consistent distance D exists between opposing surfaces of the substantially planar retaining members 230, 240. Securing the first retaining member 230 in a consistent spatial relationship with respect to the second retaining member 240 may be effectuated by bolts 226, spacers 227, and nuts 228, or any other securing implement that may be utilized to spatially secure the components into position with respect to each other. The first and second retaining members 230 and 240 may also be spaced apart by a heavy object, such as a granite countertop, that may be securely sandwiched in between them. The retaining assembly 200 may be supported by a base member 250. Moreover, the retaining assembly 220 may be secured to the base member 250 through operation of a securing assembly 260. Also depicted in FIG. 11 is the ghosted image of a cross-plane that may correspond with the locations of rotational pins, as will be further disclosed herein.

Figure 12:
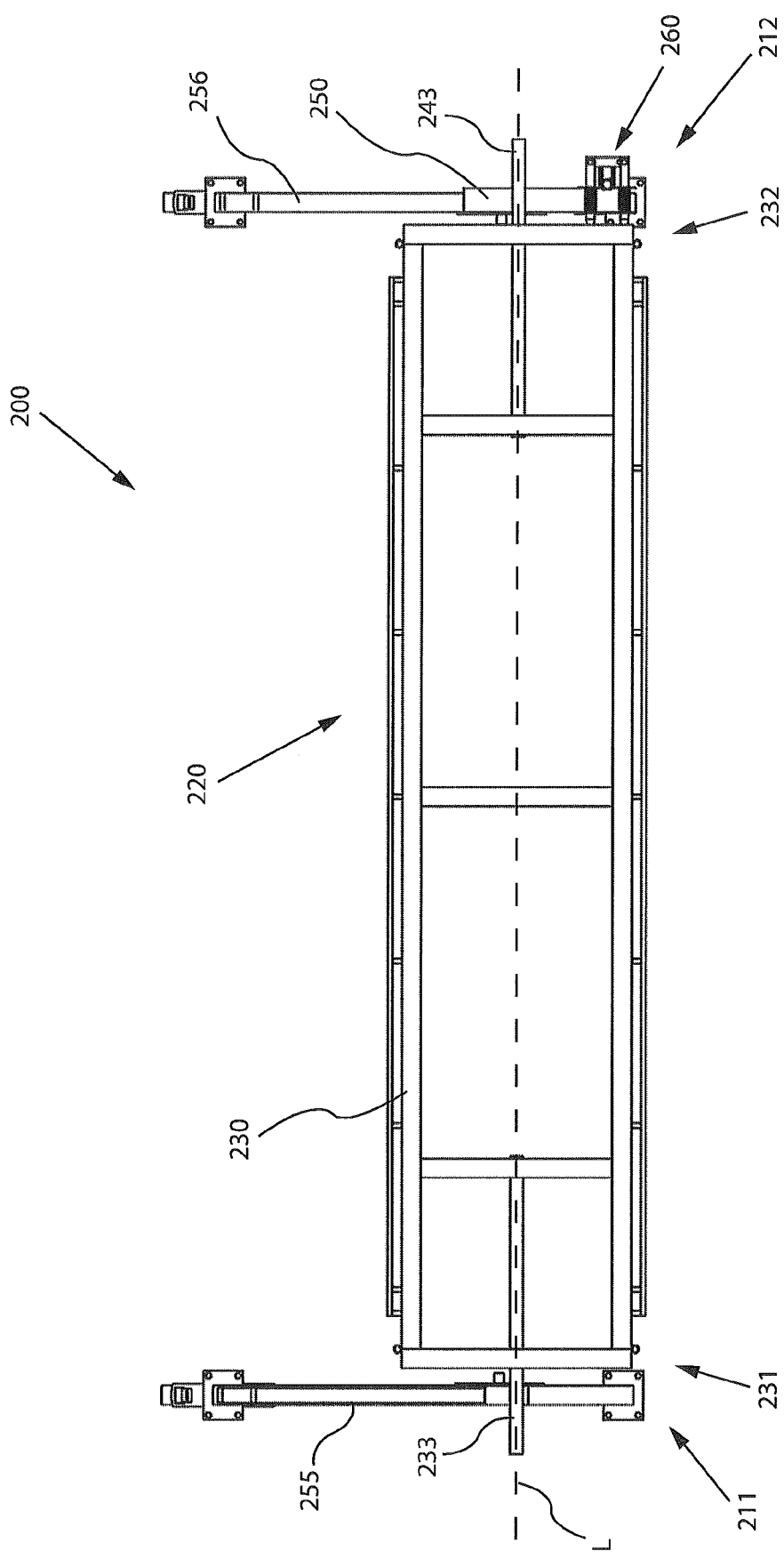
FIG. 12 depicts a top view of an embodiment of a heavy load inverting apparatus, in accordance with embodiments of the present invention.

A top view of an embodiment of a heavy object inverting apparatus 200 is depicted in FIG. 12. In the top view, the second retaining member 240 is not visible being obscured by the first retaining member 230. The first retaining member 230 includes a first end 231 and a second end 232 that may correspond to the first end 211 and the second end 212 of the heavy load inverting apparatus 200. Furthermore, the first retaining member 230 may include a first end rotational pin 233 extending from the first end 231 of the first retaining member 230 and a second end rotational pin 233 extending from the second end 232 of the first retaining member 230. The first and second rotational pins 233, 234 of the first retaining member 230 may reside along a longitudinal axis L of the retaining assembly 220 of the heavy load inverting apparatus 200. The top view also reveals how the base member 250 may include base supports 255, 256 that may help support the base member 250. The securing assembly 260 may be located at an end 211, 212 of the heavy load inverting apparatus 200.

Figure 13:
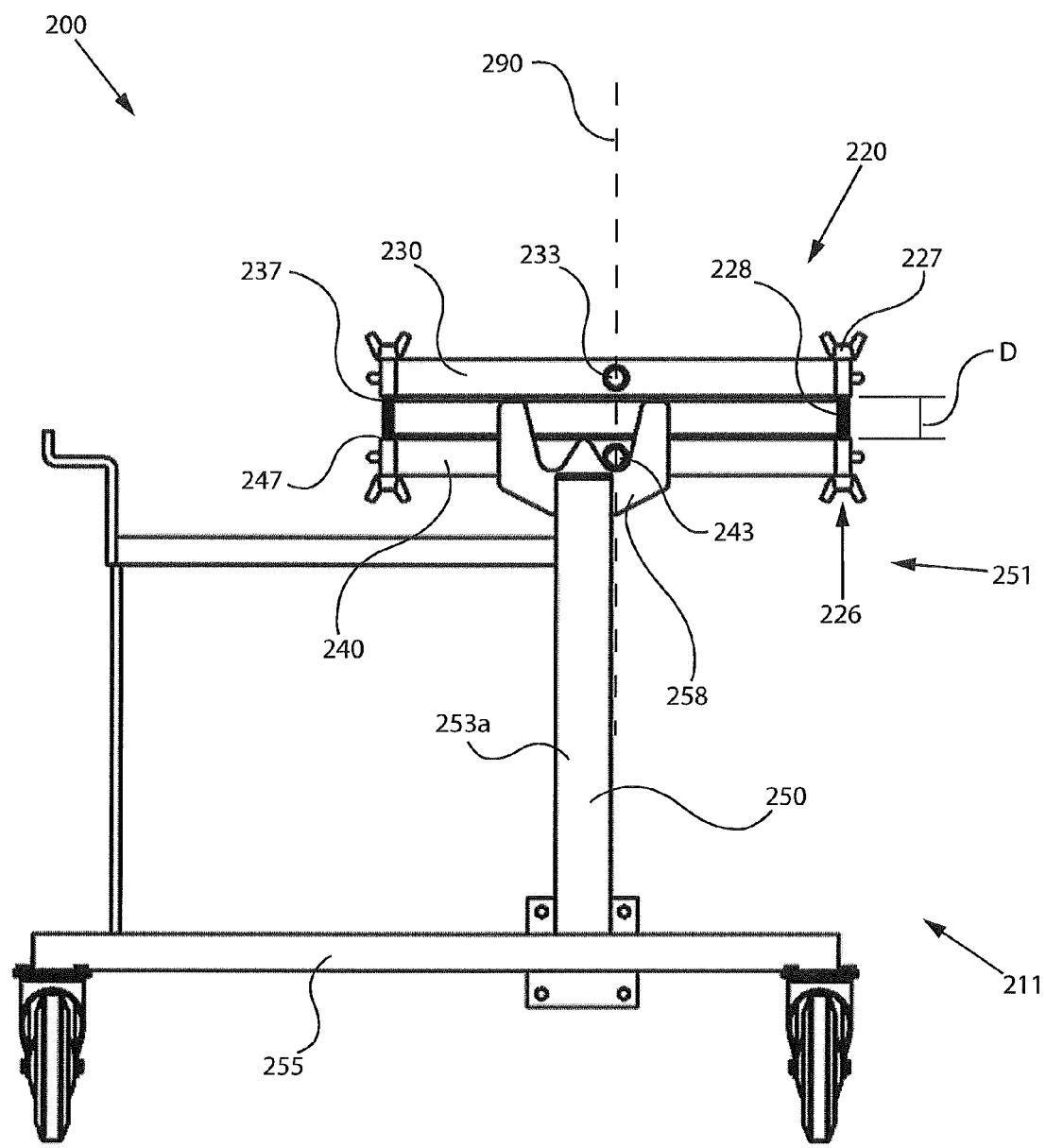
FIG. 13 depicts a first end view of an embodiment of a heavy load inverting apparatus, in accordance with embodiments of the present invention.

Referring further to the drawings, FIG. 13 depicts a first end 211 view of an embodiment of a heavy load inverting apparatus 200, in accordance with embodiments of the present invention. As illustrated, a rotational pin, such as a first end rotational pin 243 of a second retaining member 240 of the retainer assembly 220 may be supported by an open double bearing component 258 located on the first base end 251 of the base member 250. A second rotational pin, such as a first end rotational pin 233 of a first retaining member 230, may be co-located with the first end rotational pin 243 of the second retaining member 240 within a cross-plane 290 that is parallel with the longitudinal axis L depicted in FIG. 12. A first end base support 255 may operate with a first end vertical base leg 253a to help support the base member 250 and retaining assembly 220. Securing implements, such as bolts 226, spacers 227, and nuts 228 may help to define the substantially consistent distance D existent between opposing surfaces 237 and 247 of respective retaining members 230 and 240. The distance D may correspond to the thickness of a heavy object to be inverted by the heavy object inverting apparatus, such as object 300 depicted in FIG. 1. For example, the distance D may be approximately the thickness of a granite countertop securely sandwiched between the first and second retaining members 230 and 240.

Figure 14:
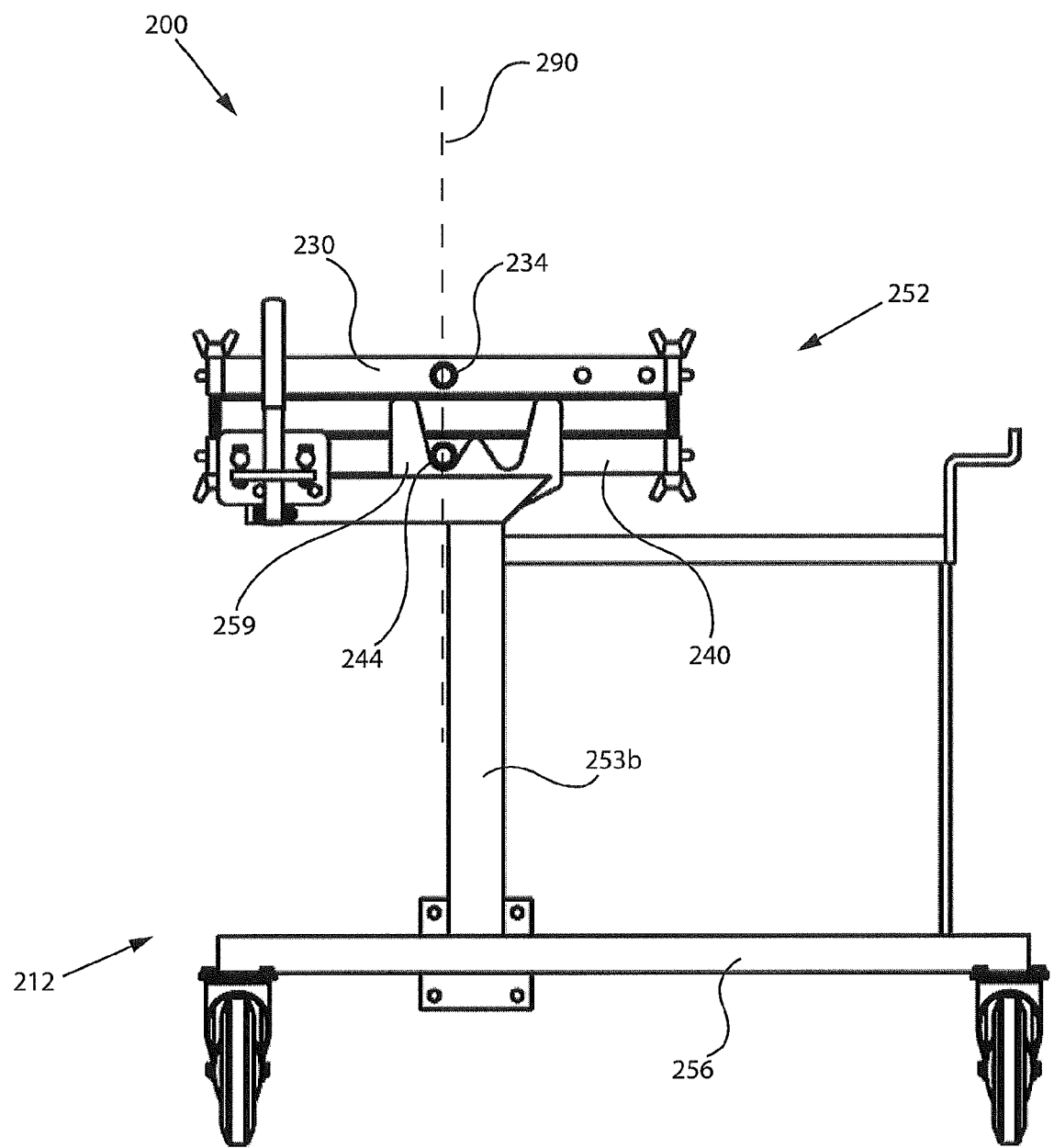
FIG. 14 depicts a second end view of an embodiment of a heavy load inverting apparatus, in accordance with embodiments of the present invention.
Figure 15:
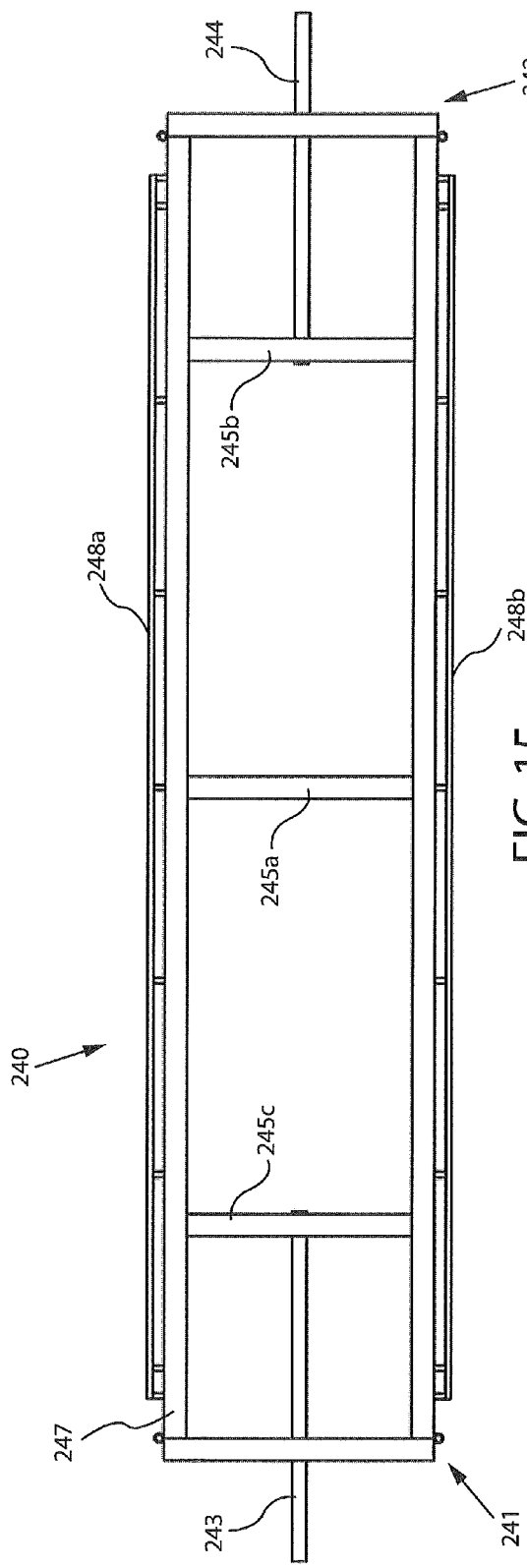
FIG. 15 depicts a top view of an embodiment of a retaining member of a heavy load inverting apparatus, in accordance with embodiments of the present invention.

FIG. 14 depicts a second end 212 view of an embodiment of a heavy load inverting apparatus 200, in accordance with embodiments of the present invention, Many of the structural arrangements of the second end 212 of the heavy load inverting apparatus 200 are correspondingly opposite similar structural elements located at the first end 211 of the heavy load inverting apparatus 200. As illustrated, a rotational pin, such as a second end rotational pin 244 of a second retaining member 240 of the retainer assembly 220 may be supported by an open double bearing component 259 located on the second base end 252 of the base member 250. A second rotational pin, such as a second end rotational pin 234 of a first retaining member 230, may be co-located with the second end rotational pin 244 of the second retaining member 240 within a cross-plane 290 that is parallel with the longitudinal axis L depicted in FIG. 12. All rotational pins, 233, 243, 234, 244 may reside together in a cross plane 290 extending parallel with a longitudinal axis L of the retaining assembly 220. A second end base support 256 may operate with a second end vertical base leg 253b to help support the base member 250 and retaining assembly 220.

Figure 17:
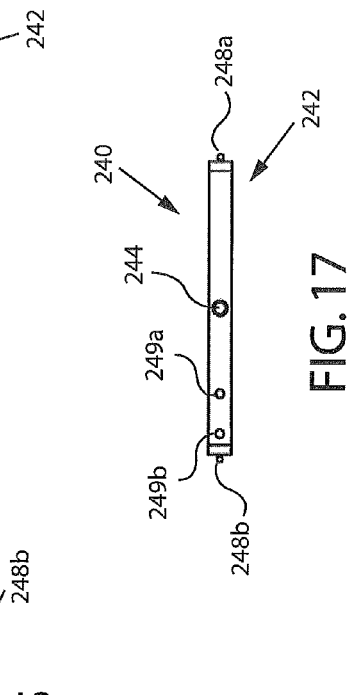
FIG. 17 depicts a second end view of an embodiment of a retaining member of a heavy load inverting apparatus, in accordance with embodiments of the present invention.
Figure 16:
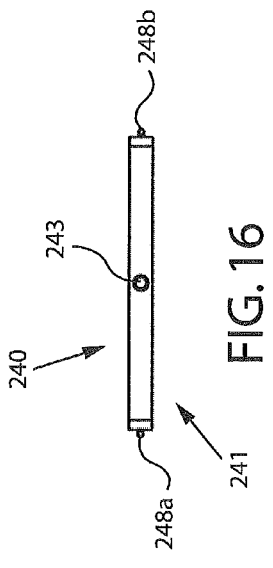
FIG. 16 depicts a first end view of an embodiment of a retaining member of a heavy load inverting apparatus, in accordance with embodiments of the present invention.
Figure 18:
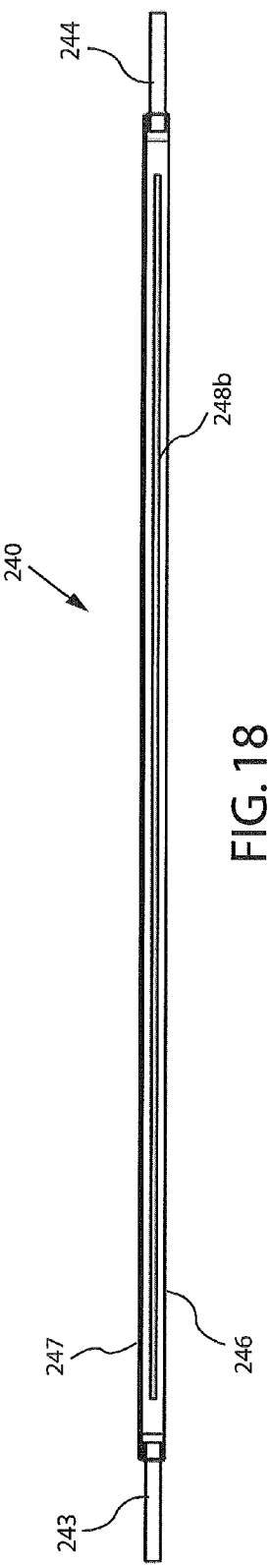
FIG. 18 depicts a side view of an embodiment of a retaining member of a heavy load inverting apparatus, in accordance with embodiments of the present invention.

With continued reference to the drawings, FIGS. 15-18 depict various views of a retaining member, such as retaining member 240, of a retaining assembly 220 of a heavy load inverting apparatus 200. It should be appreciated that the structure and various component features of retaining member 240 may be replicated in retaining member 230, so long as retaining member 230 is correctly oriented for operability within the retaining assembly 220 and in conjunction with the securing assembly 260 and base member 250. A retaining member 240 may be substantially planar and may include a first end 241 and an opposing second end 242. Extending from the first end 241 may be a first end rotational pin 243; extending from the second end 242 may be a second end rotational pin 244. Stiffening structures, such as crossbeams 245a-c may be provided in any operable location to add strength to the retaining member without burdening functionality during actual use. The retaining member 240 may include a top (or heavy object facing) surface 247 and a bottom surface 246 being opposite the top surface 247. Additionally, the retaining member 240 may include grip bars 248a-b, or other like structures that a user may utilizes when moving the retaining member 240 during a heavy object inversion process. Notably, as depicted in FIG. 17, a retaining member 240 may include receiving structures, such as openings 249a-b that may be located to receive the securing member, such as securing member 269a or 269b depicted and described further with reference to FIGS. 19, 22-23 and 25.

Returning again to the drawings, FIGS. 19-21 depict various views of an embodiment of a base member 250 and a securing assembly 260 of a heavy object inverting apparatus 200. The base member 250 may include a rib member 257 that may span almost the entire length of the heavy load inverting apparatus 200. Extending upward from the rib member 257 at the first base end 251 of the base member 250 may be a first end vertical leg base 253a. Atop the first end vertical leg base 253a may be an open double bearing component 258 The first end open double bearing component 258 along with the second end open double bearing component 259 atop the second end vertical leg base 253b extending from the rib 257 at the second end 252 of the base member 250 may include two side-by-side troughs, such as troughs $T_{F1}$ and $T_{F2}$ of the first end open double bearing component 258, and also such as troughs $T_{S1}$ and $T_{S2}$ of the second end open double bearing component 259. The troughs, such as troughs $T_{F1}$, $T_{F2}$, $T_{S1}$ and $T_{S2}$ may be positioned so that any spacing therebetween is not wider than the substantially consistent distance D existent between the spaced apart first and second retaining members 230 and 240. As depicted, there is no spacing between the side-by-side troughs because the troughs are slightly congruent with each other. However, separately spaced troughs may be employed in embodiments of open double bearing components. Moreover, the total side-by-side spacing $T_d$ occupied by both troughs should not be narrower than the substantially consistent distance D existent between the spaced apart first and second retaining members 230 and 240. To help facilitate more efficient movability of a heavy load inverting apparatus 200, four roller wheels 270a-d may be operably placed along the bottoms of first and second end base supports 255 256.

With reference to FIGS. 22-25, a securing assembly 260 is described. The securing assembly 260 may have at least one securing member, such as securing member 269a and/or 269b. The securing member(s) 269 may work with a lever 265 and a guide plate 263 to engage and/or disengage receiving structures, such as openings 249a-b that may be located in a retaining member, such as retaining member 240 or retaining member 230. A drive arm 266, working in conjunction with the lever arm 265 and operable to move the securing member pins 269 a-b, may drive the pins into and/or out of engagement with corresponding receiving structures to lock the retaining members 230 and 240 of the retaining assembly 220 in place with respect to the base 250 and contribute to a more safe and effective functionality for the heavy load inverting apparatus 200.

Those in the art should appreciate that the component elements of a heavy load inverting apparatus 200 may be formed of materials having sufficient strength and performance ability to safely handle the forces generated by the inversion process.

With reference to FIGS. 1-25 a method of inverting a heavy object is discussed. A heavy object inverting apparatus 200 may be provided. Then a heavy object may be placed between the first retaining member 230 and the second retaining member 240. This placement of the object may be accomplished opening up the retaining assembly 200 for access, such as by unsecuring the securing elements, such as the bolts 226 and nuts 227, that were used to attach the first and second retaining members 230, 240 together, and then moving the first retaining member 230 out of the way in an operable and efficient manner so that the heavy object, such as a countertop 300 shown in FIG. 1, can be placed on top of and into contact with the top surface of the second retaining member 240. Then the first retaining member 230 can be placed on top of the heavy object so that the object is sandwiched therebetween. The heavy object can be secured into position by resecuring the securing members, such as bolts 226 and nuts 227. The distance between the surface 237 of the first retaining member 230 and the opposing surface 247 of the second retaining member 240, may corresponding to the thickness of the heavy object sandwiched between the two retaining members 230, 240.

The object may be inverted by rotating the retaining assembly 220. The retaining assembly can be freed up for movement by releasing the securing member, such as the pin 269a-b through actuation of the operably connected lever arm 265, thereby permitting free rotatable motion of the retaining assembly 220 about the extended first end and second end rotational pins 243, 244. The retaining assembly may be rotated approximately 180 degrees until the associated rotational pins 233, 234 come into contact with a respective trough and then find support therein. The rotation may involve a transposition of the rotational pins 243, 244 of one retaining members 240 from one trough to the positioning of the rotational pins 233, 234 of the other retaining member 230 in the other side-by-side trough. With the retaining assembly rotated and inverted, the securing member can then be reengaged with a receiving portion of retaining member 230 so that the entire apparatus, with the heavy object secured therein, can be placed in a locked and secure configuration.

The foregoing description of the embodiments of this invention has been presented for purposes of illustration and description. While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention. Such modifications and variations that may be apparent to a person skilled in the art are intended to be included within the extent of the following claims, which following claims provide the scope of the coverage of the invention and should not be limited to the specific examples provided herein.

I claim:

1. A heavy object inverting apparatus comprising:
a retaining assembly, the retaining assembly including a first substantially planar retaining member and a second substantially planar retaining member, the first and second retaining members each having a first end, from which a first end rotation pin extends, and an opposing second end, from which a second end rotation pin extends,
wherein the first and second retaining members are configured to be securely spaced apart so that a substantially consistent distance exists between opposing surfaces of the substantially planar retaining members, and so that the first end rotational pins of the first and second retaining members and the second end rotational pins of the first and second retaining members all reside together in a cross plane extending parallel with a longitudinal axis of the retaining assembly,
a base member, the base member having a first base end and an opposing second base end, wherein each of the first and second opposing ends of the base member include an open double bearing component, each open double bearing component including two side-by-side troughs, the troughs positioned so that spacing therebetween is not wider than the substantially consistent distance existent between the spaced apart first and second retaining members and so that the total side-by-side spacing occupied by both troughs is not narrower than the substantially consistent distance existent between the spaced apart first and second retaining members, and
a securing member, operable to lock the retaining assembly into a secure position with respect to the base member, wherein both the first end and the second end rotational pins of one of the retaining members reside in corresponding opposing troughs of each opposing open double bearing component of the base member.

2. The apparatus of claim 1, wherein the substantially consistent distance corresponds to the thickness of a heavy object securely sandwiched between the first and second retaining members.

3. The apparatus of claim 1, wherein the securing member comprises a pin that is operably moved by a lever arm into and out of engagement with a receiving portion of a retaining member.

4. The apparatus of claim 1, wherein the first and second retaining members are secured to each other through connection of bolts and nuts.

5. The apparatus of claim 1, further including roller wheels attached to the base member.

6. An apparatus for inverting a heavy object, comprising:
a clamping assembly having first and second opposing planar surfaces of the heavy object sandwiched between planar surfaces of first and second opposing clamps, wherein the first and second opposing clamps are securely spaced apart a substantially consistent distance,
wherein first rotation pins extend from each end of the first opposing clamp and second rotation pins extend from each end of the second opposing clamp of the clamping assembly in the same plane along a longitudinal axis of the clamping assembly; and
first and second open hinges, each first and second open hinge having first and second adjacent grooves and an apex between the first and second adjacent grooves,
wherein a first wall of each first and second hinge rises obliquely to the apex from the first adjacent groove and a second wall rises obliquely to the apex from the second adjacent groove, and
wherein the first rotation pins straddle the apex and lie on the second oblique wall of the first and second open hinges when the second rotation pin lies in the first groove from which the first oblique wall rises of the first and second open hinges.

7. The apparatus of claim 6, wherein the first and second opposing clamps comprise top and bottom frames.

8. The apparatus of claim 6, wherein rotary hinges substitute for the open hinges.

9. The apparatus of claim 6, wherein the heavy object is a stone.

10. The apparatus of claim 6, further comprising a locking mechanism to lock the clamping assembly into a secure position.

11. A method of inverting a heavy object comprising:
providing a heavy object inverting apparatus, the apparatus having:
a retaining assembly, including two opposing retaining members each having rotational pins extending from the ends thereof,
wherein the first and second retaining members are configured to be securely sandwich a heavy object in a manner so that the rotational pins of the retaining members all reside together in a cross plane extending parallel with a longitudinal axis of the retaining assembly, and so that the retaining members are spaced apart a consistent distance, a base member, including two open double bearing components positioned at opposite ends of the base member, each open double bearing component including two side-by-side troughs, the troughs positioned so that spacing therebetween is not wider than the substantially consistent distance existent between the spaced apart first and second retaining members and so that the total side-by-side spacing occupied by both troughs is not narrower than the substantially consistent distance existent between the spaced apart first and second retaining members, and a securing member, operable to lock the retaining assembly into a secure position with respect to the base member;

placing a heavy object between the two opposing retaining members so that the object is secured;

rotating the retaining assembly approximately 180 degrees so that the secured heavy object is inverted, wherein the rotation involves a transposition of the rotational pins of one retaining member from one trough to the positioning of the rotational pins of the other retaining member in the other side-by-side trough.

12. The method of claim 11, wherein the heavy object is secured in place by operation of a securing member in connection with a retaining member.

* * * * *